United States Patent
Wang et al.

(10) Patent No.: US 11,490,443 B2
(45) Date of Patent: Nov. 1, 2022

(54) DATA TRANSMISSION METHOD AND APPARATUS, AND SESSION MANAGEMENT DEVICE

(71) Applicant: CHINA ACADEMY OF TELECOMMUNICATIONS TECHNOLOGY, Beijing (CN)

(72) Inventors: Hucheng Wang, Beijing (CN); Ming Ai, Beijing (CN); Yunjing Hou, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 510 days.

(21) Appl. No.: 16/089,262

(22) PCT Filed: Mar. 7, 2017

(86) PCT No.: PCT/CN2017/075844
§ 371 (c)(1),
(2) Date: Sep. 27, 2018

(87) PCT Pub. No.: WO2017/166978
PCT Pub. Date: Oct. 5, 2017

(65) Prior Publication Data
US 2019/0110330 A1    Apr. 11, 2019

(30) Foreign Application Priority Data
Mar. 28, 2016 (CN) .......................... 201610183650.3

(51) Int. Cl.
*H04W 76/20* (2018.01)
*H04W 76/12* (2018.01)
(Continued)

(52) U.S. Cl.
CPC ............. *H04W 76/20* (2018.02); *H04L 67/52* (2022.05); *H04L 67/568* (2022.05); *H04L 67/63* (2022.05);
(Continued)

(58) Field of Classification Search
CPC ... H04L 67/18; H04L 67/327; H04L 67/2842; H04L 67/63; H04L 67/52; H04L 67/568;
(Continued)

(56) References Cited

U.S. PATENT DOCUMENTS

2010/0232393 A1   9/2010   Shuai et al.
2011/0199905 A1   8/2011   Pinheiro et al.
(Continued)

FOREIGN PATENT DOCUMENTS

CN   1668024 A     9/2005
CN   101720090 A   6/2010
(Continued)

OTHER PUBLICATIONS

Barton, PGW and SGW Selection procedures in LTE, 2013, Wayback Machine (web.archive.org/web/20160315133445/http://www.lteandbeyond.com/2013/03/pgw-and-sgw-selection-procedures-in-lte.html), whole document (Year: 2013).*

(Continued)

*Primary Examiner* — Benjamin H Elliott, IV
*Assistant Examiner* — Jose L Perez
(74) *Attorney, Agent, or Firm* — Ladas & Parry, LLP

(57) ABSTRACT

A data transmission method, a data transmission apparatus, and a session management device are provided. The data transmission method includes obtaining state information of a UE to which downlink data is destined; selecting, for the UE, a first gateway function entity for transmission of the current downlink data according to the state information of the UE; determining a first data transmission path between
(Continued)

the first gateway function entity and a second gateway function entity; and performing the transmission of the downlink data according to the first data transmission path.

18 Claims, 12 Drawing Sheets

(51) Int. Cl.
  *H04L 67/52* (2022.01)
  *H04L 67/63* (2022.01)
  *H04L 67/568* (2022.01)
  *H04W 72/04* (2009.01)
  *H04W 88/16* (2009.01)

(52) U.S. Cl.
  CPC ......... *H04W 72/042* (2013.01); *H04W 76/12* (2018.02); *H04W 88/16* (2013.01)

(58) Field of Classification Search
  CPC ... H04W 76/12; H04W 72/042; H04W 76/20; H04W 48/17; H04W 88/16
  See application file for complete search history.

(56) References Cited

U.S. PATENT DOCUMENTS

| | | | |
|---|---|---|---|
| 2012/0099561 A1 | 4/2012 | Zhao et al. | |
| 2012/0236708 A1 | 9/2012 | Kompella et al. | |
| 2013/0301611 A1* | 11/2013 | Baghel | H04L 63/123 370/331 |
| 2015/0071169 A1 | 3/2015 | Wang | |
| 2015/0156660 A1 | 6/2015 | Luo | |
| 2015/0201452 A1 | 7/2015 | Wang et al. | |
| 2017/0164349 A1* | 6/2017 | Zhu | H04W 48/18 |
| 2017/0257801 A1* | 9/2017 | Toth | H04W 8/10 |
| 2017/0339611 A1* | 11/2017 | Landais | H04W 8/06 |
| 2017/0374542 A1* | 12/2017 | Ryu | H04W 8/08 |
| 2018/0014339 A1* | 1/2018 | Baek | H04W 76/10 |
| 2018/0041928 A1* | 2/2018 | Youn | H04W 28/0278 |
| 2018/0206207 A1* | 7/2018 | Yu | H04W 8/08 |
| 2018/0212710 A1* | 7/2018 | Ronneke | H04W 28/02 |
| 2018/0220479 A1* | 8/2018 | Shu | H04W 88/16 |
| 2018/0332462 A1* | 11/2018 | Kim | H04W 8/02 |
| 2018/0359802 A1* | 12/2018 | Cho | H04L 69/22 |
| 2019/0021034 A1* | 1/2019 | Kim | H04W 36/02 |
| 2019/0021130 A1* | 1/2019 | Kim | H04W 76/20 |
| 2019/0053045 A1* | 2/2019 | Cho | H04W 68/00 |
| 2019/0116531 A1* | 4/2019 | Ryu | H04W 36/0022 |
| 2019/0357276 A1* | 11/2019 | Hu | H04W 76/12 |

FOREIGN PATENT DOCUMENTS

| | | | |
|---|---|---|---|
| CN | 101730176 | A | 6/2010 |
| CN | 101741822 | A | 6/2010 |
| CN | 101772114 | A | 7/2010 |
| CN | 101931898 | A | 12/2010 |
| CN | 101938787 | A | 1/2011 |
| CN | 101998331 | A | 3/2011 |
| CN | 102026241 | A | 4/2011 |
| CN | 102026403 | A | 4/2011 |
| CN | 102316521 | A | 1/2012 |
| CN | 102333293 | A | 1/2012 |
| CN | 102340754 | A | 2/2012 |
| CN | 102802215 | A | 11/2012 |
| CN | 104023327 | A | 9/2014 |
| EP | 3091762 | A1 | 9/2016 |
| JP | 2014509798 | A | 4/2014 |
| JP | 2015517758 | A | 6/2015 |
| KR | 20150013453 | A | 2/2015 |
| KR | 20150041117 | A | 4/2015 |
| KR | 101541987 | B1 | 8/2015 |
| WO | 2010075729 | A1 | 7/2010 |
| WO | 2011052136 | A1 | 5/2011 |
| WO | 2011099821 | A2 | 8/2011 |
| WO | 2011134329 | A1 | 11/2011 |
| WO | 2015180181 | A1 | 12/2015 |

OTHER PUBLICATIONS

International Search Report for PCT/CN2017/075844 dated May 27, 2017and its English translation provided by WIPO.
Written Opinion of the International Search Authority PCT/CN2017/075844 dated May 27, 2017and its English translation provided by Google Translate.
The First Office Action dated May 22, 2013 in CN application 201110274230. 3 (CN 102316521 A) with translation from Global Dossier.
The Second Office Action dated Sep. 24, 2013 in CN application 201110274230. 3 (CN 102316521 A) with translation from Global Dossier.
The Third Office Action dated Dec. 2, 2013 in CN application 201110274230. 3 (CN 102316521 A) with translation from Global Dossier.
The First Office Action dated May 27, 2017 in CN application 201310066181.3 (CN 1104023327 A) with translation from Google translate.
ZTE. (Jul. 11-15, 2011). *SA WG2 Meeting #86*: NAS PDU based Small Data Transmission. Naantali, Finland.
Alcatel-Lucent, Alcatel-Lucent Shanghai Bell. (Nov. 12-16, 2012). SA WG2 Meeting #94: Optimization for transmission of infrequent or frequent small data. New Orleans, USA.
Catt. (Jan. 28-Feb. 1, 2013 SA WG2 Meeting #95: Downlink small data transfer using RRC message. Prague, Czech Republic.
3rd Generation Partnership Project;Technical Specification Group Services and System Aspects; General Packet Radio Service (GPRS) enhancements for Evolved Universal Terrestrial Radio Access Network (E-UTRAN) access(Release 10). 23.401 V10.4.0 (Jun. 2011). http://www.3gpp.org.
Extended European Search Report, from EP app. No. 17773009.0, dated Feb. 11, 2019.
First Office Action and search report, from TW app. No. 106109456, dated Jan. 22, 2018, with machine English translation.
Written Opinion of the International Searching Authority for PCT/CN2017/075844, dated May 27, 2017, with English translation from WIPO.
International Preliminary Report on Patentability from PCT/CN2017/075844, dated Oct. 2, 2019, with English translation from WIPO.
Notice of Reasons for Refusal from JP app. No. 2018-551341, dated Jul. 30, 2019, with English translation from Global Dossier.
First Office Action and Search Report from CN app. No. 201610183650. 3, dated May 7, 2019, with English translation provided by Global Dossier.
Notice of Reasons for Refusal for JP app. No. 2018-551341, dated Jan. 8, 2020, with English translation provided by Global Dossier.
Notification of Reason for Refusal for KR app. No. 2018-7029847, dated Dec. 27, 2019, with English translation from KIPO.

* cited by examiner

DATA TRANSMISSION METHOD AND APPARATUS, AND SESSION MANAGEMENT DEVICE

CROSS-REFERENCE TO RELATED APPLICATIONS

The present application is the U.S. National Phase of PCT/CN2017/075844 filed on Mar. 7, 2017, which claims priority to the Chinese patent application No. 201610183650.3, filed in China on Mar. 28, 2016, the disclosures of which are incorporated herein by reference in their entireties.

TECHNICAL FIELD

The present disclosure relates to a field of communication technology, and in particular, to a data transmission method, a data transmission apparatus, and a session management device.

BACKGROUND

In a relevant Long Term Evolution (LTE) system, when downlink data arrives at a service gateway (S-GW), the service gateway sends a Downlink Data Notification to a Mobility Management Entity (MME) so that the MME initiates a paging procedure. A User Equipment (UE) receives a paging message sent by the MME and triggers a Service Request Procedure. After a radio bearer and a S1 bearer are established, the service gateway transmits downlink data to the UE. A service request procedure triggered by a network side includes steps shown in FIG. 1.

Step 1.1: receiving, by the service gateway, the downlink data transmitted by a packet data gateway.

Step 1.2: caching, by the service gateway when the UE is not in a connected state, the downlink data, and sending the Downlink Data Notification to the MME related to the UE.

Step 1.3: sending, by the MME after the MME receives the Downlink Data Notification, a downlink data notification response to the service gateway.

Step 1.4: sending, by the MME, the paging message to all base stations (BSs) in a tracking area (TA) within which the UE has registered.

Step 1.5: forwarding the paging message sent by the MME and received by the BSs, to the UE by the BSs.

Step 1.6: triggering the Service Request Procedure by the UE after the UE receives the paging message.

Step 1.7: establishing a S1-U bearer when the Service Request Procedure proceeds, and transmitting the downlink data to the UE by the service gateway.

A next-generation mobile communication network needs to support more plentiful network applications, so as to adapt to service requirements of various scenes, meet service and performance needs of different users, and support accesses from various types of devices. Various service requirements generate different demands on aspects of network mobility management, bandwidth, quality of service, security, accounting, and the like. In order to support various service requirements, lower costs of network construction and network operation, and enhance a flexibility of network management and an efficiency of network resources, "a network fragmentation (or a network slice)" is conceived in the next-generation mobile communication network to support specific types of communication services, and a network function of the network slice is a combination of specific logical network functions directed to specific service requirements. As shown in FIG. 2, a Third Generation Partnership Project (3GPP) network of an operator may be divided into three network slices, i.e., a Critical Machine-Type-Communication (MTC) network Slice, a Massive MTC network Slice, and a Mobile Broadband (MBB) network Slice. Each of the slices corresponds to a user service thereof, and implements data communication with a user through a Radio Access Network (RAN). It should be further noted that in order that one user may obtain multiple services simultaneously, different services for the user may access different ones of the network slices, respectively.

After a status management function of a UE independent from the network slices is deployed, a status maintenance for the UE is finished independently. Generally, for a network slice accessed by the UE, if no data transmission exists in the network slice, the network does not need to maintain and update context information in a control plane and a transmission path in a user plane of the UE, to ensure a utilization rate of network resources. However, this solution has a problem that a transmission path in a core network cannot be updated dynamically, and incurs that downlink data cannot be forwarded to a correct gateway connected to a base station currently providing service to the UE.

When the UE accesses multiple network slices simultaneously, if data transmission exists in one of the network slices, the network slice needs to maintain the context information in the control plane and the transmission path in the user plane of the UE. Other network slices accessed by the UE and having no data transmission do not need to maintain and update the context information in the control plane and the transmission path in the user plane of the UE, to enhance the utilization rate of network resources. If a network slice needing not to maintain and update the context information in the control plane and the transmission path in the user plane of the UE is named as an idle slice, then the idle slice has two types as follow.

1. the UE has entered an idle state, and all of the network slices are idle slices; and 2. the UE accesses multiple network slices, but the UE only recovers a transmission link (similar to a S1 connection) between the core network and an access network in one of the multiple network slices, and performs data transmission: the UE does not recover the transmission link between the core network and the access network in other network slices accessed by the UE, and the other network slices are idle slices.

Since the idle slices do not maintain the transmission path in the user plane for the UE, serving gateways (a serving gateway is defined as a boundary gateway connected with a base station in the core network) in the network slices cannot be updated when a base station accessed by the UE is changed. Therefore, when the network slices receive downlink data destined to the UE, the downlink data might be cached to an incorrect gateway, causing improper transmission of the downlink data.

SUMMARY

An objective of the present disclosure is to provide a data transmission method, a data transmission apparatus and a session management device so as to solve a problem that idle network slices do not maintain a transmission path in a user plane for a User Equipment (UE), downlink data destined to the UE might be cached to an incorrect gateway function entity when the network slices receive the downlink data, causing improper transmission of the downlink data.

To address the above technical problem, some embodiments of the present disclosure provide a data transmission method. The data transmission method includes: obtaining state information of a UE to which downlink data is destined; selecting, for the UE, a first gateway function entity for transmission of the current downlink data according to the state information of the UE; determining a first data transmission path between the first gateway function entity and a second gateway function entity; and performing the transmission of the current downlink data according to the first data transmission path.

Further, the obtaining state information of the UE to which downlink data is destined, includes: receiving a downlink data notification message sent from the second gateway function entity; sending a request message for obtaining the state information of the UE to a function entity for managing a state of the UE according to the downlink data notification message; and receiving the state information of the UE fed back from the function entity for managing a state of the UE according to the request message.

Further, the obtaining state information of the UE to which downlink data is destined, includes: receiving a downlink data notification message sent from a third gateway function entity currently connected to the second gateway function entity: sending a request message for obtaining the state information of the UE to a function entity for managing a state of the UE, according to the downlink data notification message; and receiving the state information of the UE fed back from the function entity managing the state of the UE according to the request message.

Further, the selecting, for the UE, a first gateway function entity for transmission of the current downlink data according to the state information of the UE, includes: selecting, when the UE is in an idle state, the first gateway function entity for the transmission of the current downlink data, according to location area information in a latest location update of the UE; or selecting, when the UE is in a connected state, the first gateway function entity for the transmission of the current downlink data, according to information of a base station serving the UE currently.

Further, the determining a first data transmission path between the first gateway function entity and a second gateway function entity, includes: establishing the first data transmission path between the first gateway function entity and the second gateway function entity, when a third gateway function entity currently connected to the second gateway function entity is different from the first gateway function entity.

Further, the performing the transmission of the downlink data according to the first data transmission path, includes: establishing a second data transmission path between the first gateway function entity and a base station currently serving the UE, according to the first data transmission path; and transmitting the downlink data cached in the first gateway function entity to the UE through the second data transmission path.

Further, the establishing a second data transmission path between the first gateway function entity and a base station currently serving the UE, according to the first data transmission path, includes: sending a paging message to the UE when the UE is in the idle state; receiving a service request sent by the UE in response to the paging message; sending a request for establishing an air-interface bearer to the base station currently serving the UE, according to the service request; and establishing the second data transmission path between the first gateway function entity and the base station, after the air-interface bearer between the UE and the base station is established.

Further, the establishing a second data transmission path between the first gateway function entity and a base station currently serving the UE, according to the first data transmission path, includes: sending a request for establishing an air-interface bearer to a base station currently serving the UE, when the UE is in a connected state; and establishing a second data transmission path between the first gateway function entity and the base station, after the air-interface bearer between the UE and the base station is established.

Further, the downlink data cached in the first gateway function entity is: downlink data sent from the second gateway function entity to the first gateway function entity; or downlink data forwarded from a third gateway function entity currently connected to the second gateway function entity to the first gateway function entity through a forwarding path.

Some embodiments of the present disclosure provide a data transmission apparatus. The data transmission apparatus includes: an obtaining module configured to obtain state information of a UE to which downlink data is destined; a selection module configured to select, for the UE, a first gateway function entity for transmission of the current downlink data according to the state information of the UE; a determination module configured to determine a first data transmission path between the first gateway function entity and a second gateway function entity; and a transmission module configured to perform the transmission of the current downlink data according to the first data transmission path.

Further, the obtaining module includes: a first receiving submodule configured to receive a downlink data notification message sent from the second gateway function entity: a first sending submodule configured to send a request message for obtaining the state information of the UE to a function entity for managing a state of the UE, according to the downlink data notification message; and a second receiving submodule configured to receive the state information of the UE fed back from the function entity for managing a state of the UE according to the request message.

Further, the obtaining module includes: a third receiving submodule configured to receive a downlink data notification message sent from a third gateway function entity currently connected to the second gateway function entity; a second sending submodule configured to send, according to the downlink data notification message, a request message for obtaining the state information of the UE to a function entity for managing a state of the UE; and a fourth receiving submodule configured to receive the state information of the UE fed back from the function entity for managing a state of the UE according to the request message.

Further, the selection module is specifically configured to: select, when the UE is in an idle state, the first gateway function entity for transmission of the current downlink data, according to location area information in a latest location update of the UE; or select, when the UE is in a connected state, the first gateway function entity for the transmission of the current downlink data, according to information of a base station serving the UE currently.

Further, the determination module is specifically configured to: determine the first data transmission path between the first gateway function entity and the second gateway function entity, when a third gateway function entity currently connected to the second gateway function entity is different from the first gateway function entity.

Further, the transmission module includes: an establishment submodule configured to establish a second data transmission path between the first gateway function entity and a base station currently serving the UE, according to the first data transmission path; and a transmission submodule configured to transmit the downlink data cached in the first gateway function entity to the UE through the second data transmission path.

Further, the establishment submodule includes: a paging unit configured to send a paging message to the UE when the UE is in an idle state; a first receiving unit configured to receive a service request sent by the UE in response to the paging message; a first sending unit configured to send a request for establishing an air-interface bearer to the base station currently serving the UE, according to the service request; and a first establishment unit configured to establish the second data transmission path between the first gateway function entity and the base station, after the air-interface bearer between the UE and the base station is established.

Further, the establishment submodule includes: a second sending unit configured to send a request for establishing an air-interface bearer to the base station currently serving the UE, when the UE is in a connected state; and a second establishment unit configured to establish the second data transmission path between the first gateway function entity and the base station, after the air-interface bearer between the UE and the base station is established.

Further, the downlink data cached in the first gateway function entity is: downlink data sent front the second gateway function entity to the first gateway function entity; or downlink data forwarded from a third gateway function entity currently connected to the second gateway function entity to the first gateway function entity through a forwarding path.

Some embodiments of the present disclosure provide a data transmission apparatus. The data transmission apparatus includes a processor, a storage connected to the process through a bus interface and configured to store computer instructions and data used by the processor when the processor performs operations, wherein when the computer instructions are executed by the processor, the processor implements the above method.

Some embodiments of the present disclosure further provide a session management device. The session management device includes the above data transmission apparatus.

Beneficial effect of the present disclosure is as follows. When an idle network slice performs transmission of downlink data, a gateway function entity for direct transmission of the downlink data in the network slice is selected according to a state of the UE, so that a gateway functional entity receiving the downlink data initially may transmit the downlink data to a correct gateway function entity for direct transmission of the downlink data, thus avoiding the downlink data from being transmitted to an incorrect gateway functional entity, and a problem of the downlink data incapable of being transmitted to the UE to which the downlink data is destined is solved. Furthermore, the data transmission method provided in the present disclosure ensures accurate transmission of the downlink data and enhance communication reliability.

DETAILED DESCRIPTION

In order to make technical purposes, technical solutions, and advantages of the present disclosure more clear, the present disclosure will be described hereinafter in details in conjunction with accompanying drawings and specific embodiments of the present disclosure.

Since idle network slices do not maintain a transmission path in a user plane for a User Equipment (UE), downlink data destined to the UE might be cached to an incorrect gateway function entity when the network slices receive the downlink data, causing improper transmission of the downlink data. To address this problem, the present disclosure provides a data transmission method, a data transmission apparatus, and a session management device.

Figure 1:
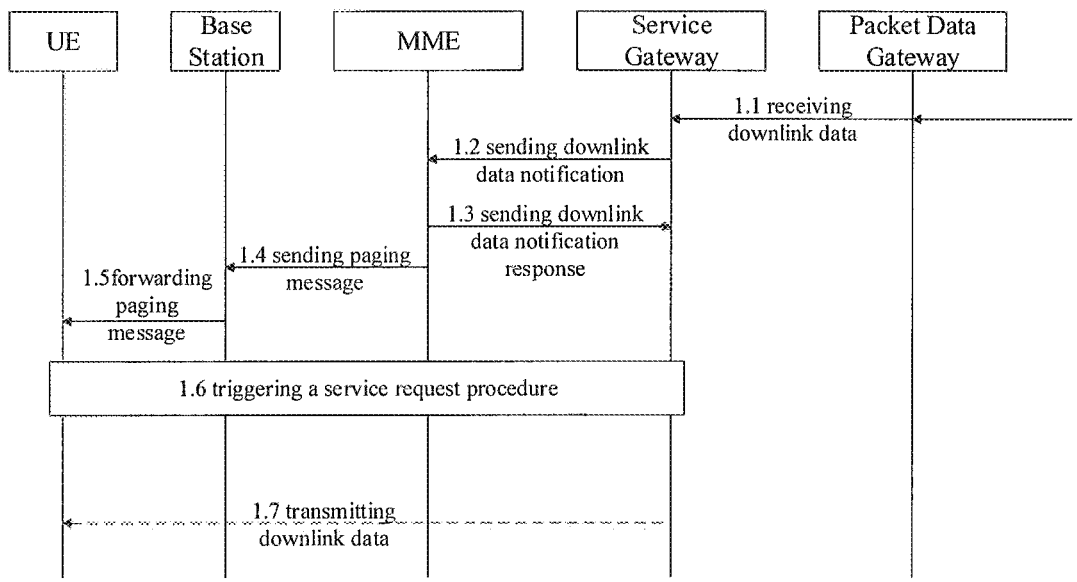
FIG. 1 is a flowchart of a service request process triggered by a network side.
Figure 2:
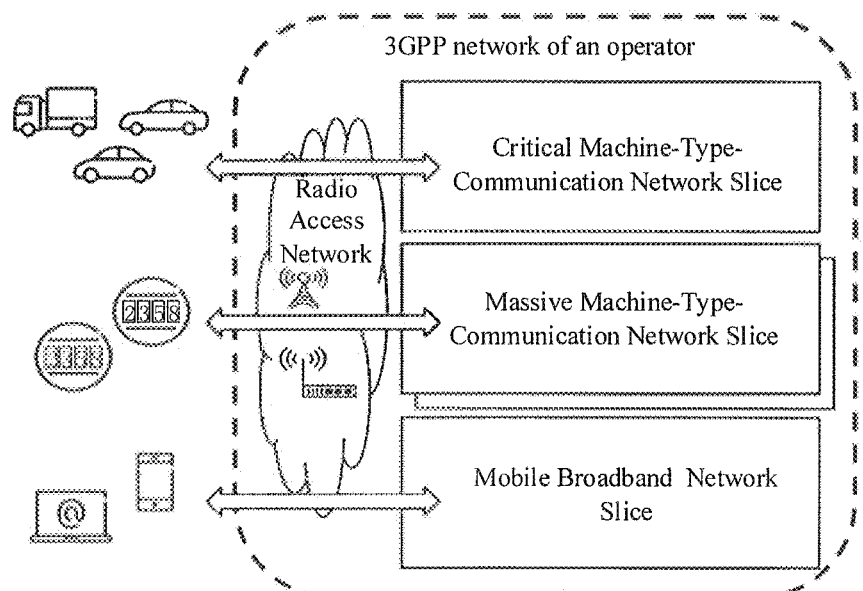
FIG. 2 is a schematic diagram of providing different network slices for different services, respectively.
Figure 3:
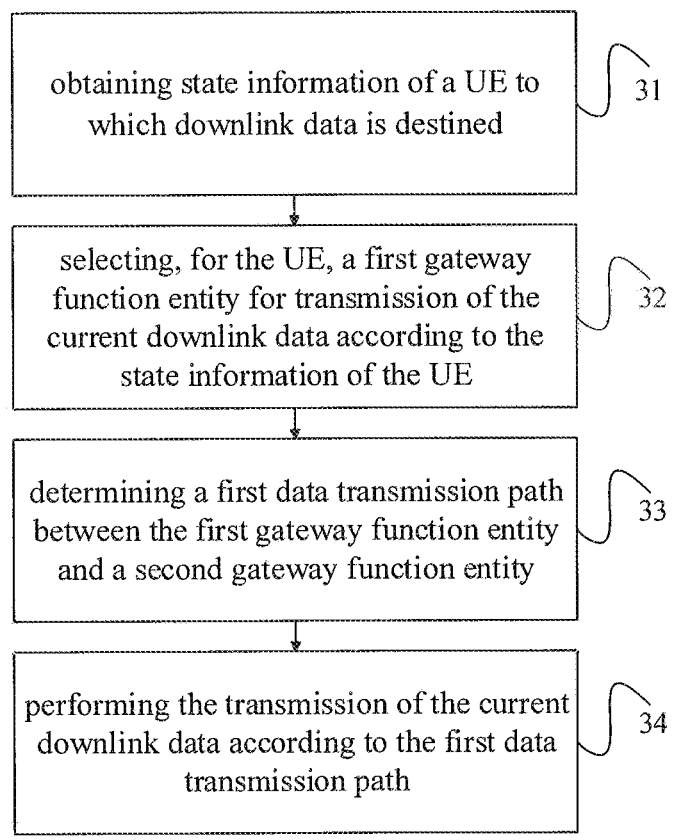
FIG. 3 is a flowchart of a data transmission method according to some embodiments of the present disclosure.

As shown in FIG. 3, the data transmission method provided in some embodiments of the present disclosure includes step 31 to step 34.

Step 31: obtaining state information of a UE to which downlink data is destined.

Step 32: selecting, for the UE, a first gateway function entity for transmission of current downlink data according to the state information of the UE.

Step 33: determining a first data transmission path between the first gateway function entity and a second gateway function entity.

Step 34: performing the transmission of the current downlink data according to the first data transmission path.

It is noted that the data transmission method is applied in an idle network slice, and the first gateway function entity in the embodiment refers to a first service gateway in the network slice, i.e., a new service gateway selected for the transmission of the downlink data, and the second gateway function entity refers to a serving gateway in the network slice. When the idle network slice is to be used for the transmission of the downlink data, the LIE to which the downlink data is destined is needed to be determined, and then a service gateway is needed to be determined for the UE. Thereafter, the determined service gateway is used to perform the transmission of the downlink data, and correct transmission of the downlink data is ensured, and a reliability of communication is enhanced.

It should be noted that the data transmission method is used in a data transmission apparatus in the present disclosure. Specifically, the data transmission apparatus may be included in a session management function entity.

Figure 4A:
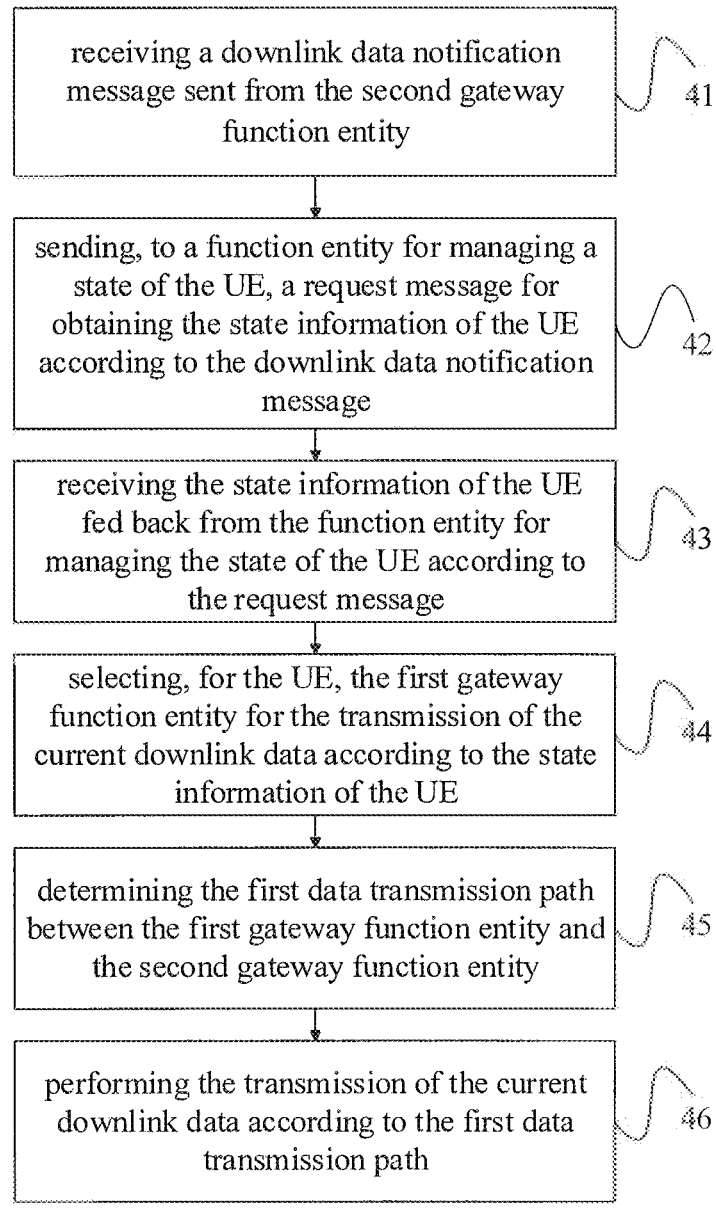
FIG. 4A is another flowchart of a data transmission method according to some embodiments of the present disclosure.

As shown in FIG. 4, the data transmission method provided in some embodiments of the present disclosure includes step 41 to step 46.

Step 41: receiving a downlink data notification message sent from the second gateway function entity.

It should be noted that the second gateway function entity in the embodiment refers to a data gateway because the downlink data is sent to the data gateway firstly when the network side sends the downlink data. In this embodiment, after the data gateway has received the downlink data, because the data gateway does not know whether a service gateway connected to the data gateway is a correct service gateway capable of performing the transmission of the downlink data to the UE, the data gateway needs to select a service gateway after the data gateway has received the downlink data, and sends a downlink data notification message to the session management function entity so that the session management function entity may determine the correct service gateway capable of receiving correctly the downlink data.

Step 42: sending, to a function entity for managing a state of the UE, a request message for obtaining state information of the UE according to the downlink data notification message.

Step 43: receiving the state information of the UE fed back from the function entity for managing the state of the UE according to the request message.

Specifically, when the function entity for managing the state of the UE has received the request message for requesting the state information of the UE, the function entity finds corresponding state information of the UE in a state context of the UE stored in the function entity, and feeds the information to the session management function entity.

Step 44: selecting, for the UE, the first gateway function entity for the transmission of the current downlink data according to the state information of the UE.

It should be noted that the first gateway function entity in the embodiment refers to the first service gateway.

Step 45: determining the first data transmission path between the first gateway function entity and the second gateway function entity.

Step 46: performing the transmission of the current downlink data according to the first data transmission path.

Figure 4B:
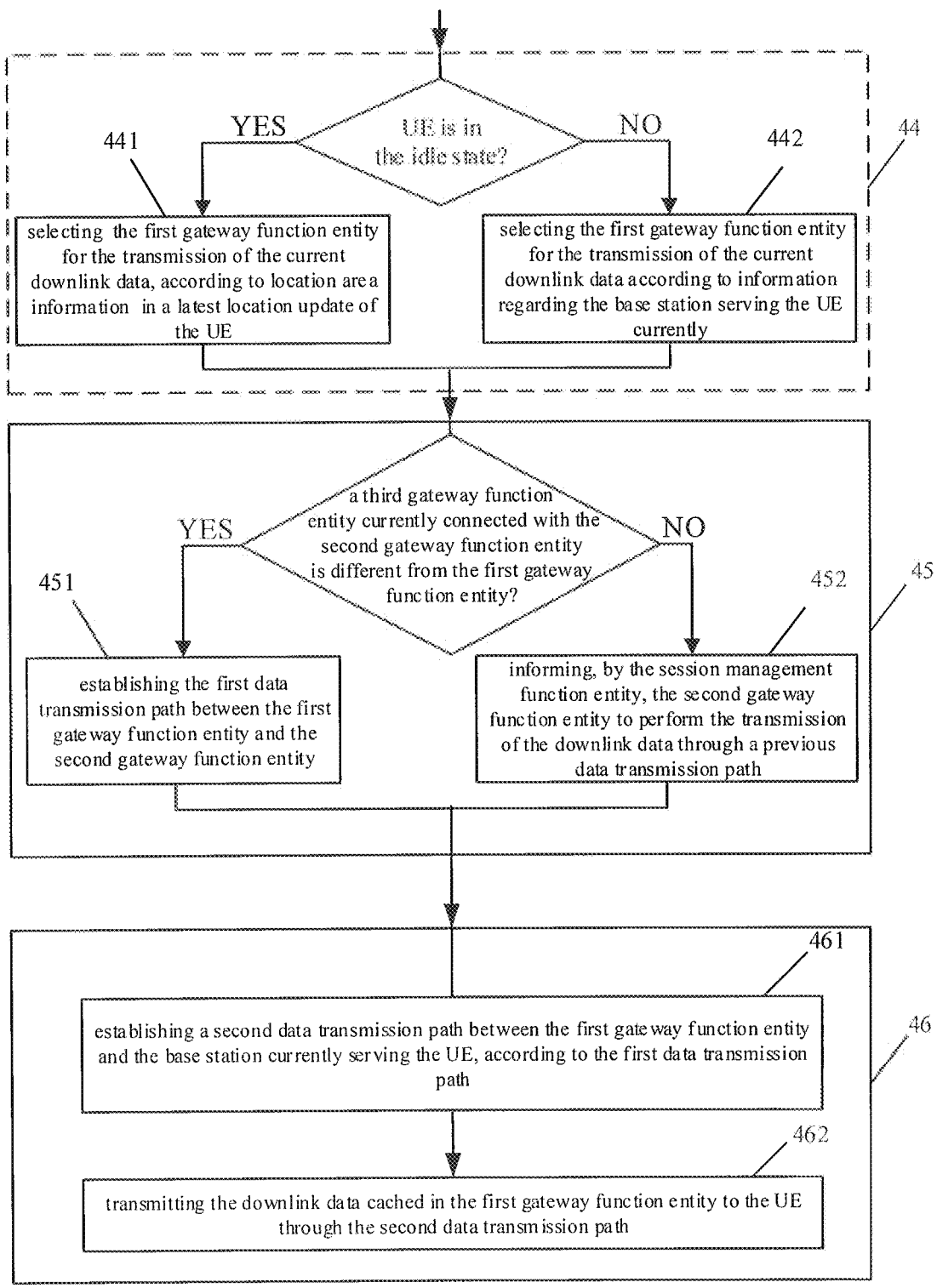
FIG. 4B is a detailed flowchart of some steps in the data transmission method according to some embodiments of the present disclosure.
Figure 4C:
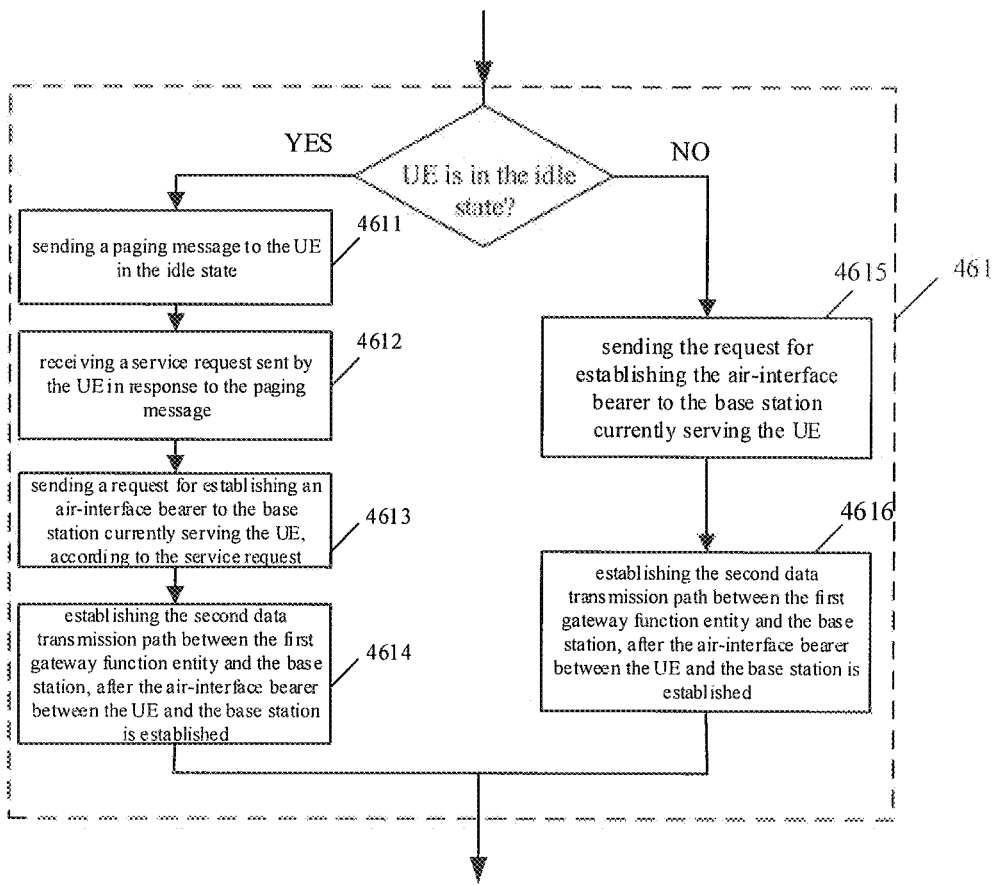
FIG. 4C is a detailed flowchart of sub-steps of one step of the data transmission method according to some embodiments of the present disclosure.

A specific implementation of steps 44 to 46 will be described hereinafter in conjunction with FIGS. 4B-4C.

In the specific implementation, the step 44 includes a sub-step 441, i.e., selecting, when the UE is in the idle state, the first gateway function entity for the transmission of the current downlink data, according to location area information in a latest location update of the UE.

It should be noted that, when the UE is in the idle state, the UE is not connected with a base station currently and is incapable of obtaining information regarding the base station. The location area information in the latest location update of the UE needs to be obtained from tracking area (TA) information and the base station serving the UE is determined according to the location area information. Then, the service gateway is selected.

Optionally, in the specific implementation, the step 44 includes a sub-step 442, i.e., selecting, when the UE is in a connected state, the first gateway function entity for the transmission of the current downlink data, according to information regarding the base station serving the UE currently.

It is noted that when the UE is in the connected state, the UE is connected with the base station, the session management function entity only needs to obtain the information regarding the base station serving the UE currently, and the service gateway may be selected.

Specifically, when determining the transmission path between the data gateway and the service gateway, the step 45 includes a sub-step 451 and a sub-step 452.

Step 451: establishing the first data transmission path between the first gateway function entity and the second gateway function entity, when a third gateway function entity currently connected with the second gateway function entity is different from the first gateway function entity.

Step 452: informing, by the session management function entity, the second gateway function entity to perform the transmission of the downlink data through a previous data transmission path, when the third gateway function entity currently connected with the second gateway function entity is the same as the first gateway function entity.

After the transmission path between the second gateway function entity and the first gateway function entity has been established, a specific process of the transmission of the downlink data may be started. In the specific implementation, the step 46 includes a sub-step 461 and a sub-step 462.

Sub-step 461: establishing a second data transmission path between the first gateway function entity and the base station currently serving the UE, according to the first data transmission path.

By implementing the sub-step 461, a transmission path between the newly determined service gateway in the network slice and the base station serving the UE is established to ensure that the network slice and the base station is in a connected state.

Sub-step 462: transmitting the downlink data cached in the first gateway function entity to the UE through the second data transmission path.

After the transmission path between the service gateway and the base station is established, the downlink data cached in the service gateway may be transmitted to the base station, and the base station sends the downlink data to the UE to which the downlink data is destined.

It should be noted that, in this embodiment, the downlink data cached in the first gateway function entity is the downlink data sent from the second gateway function entity to the first gateway function entity.

In this embodiment, if the UE to which the downlink data is destined is in the idle state, the UE needs to be connected with the base station firstly before transmitting the downlink data to the UE. In the specific implementation, as shown in FIG. 4C, the sub-step 461 includes sub-steps 4611-4614.

Sub-step 4611: sending a paging message to the UE when the UE is in the idle state.

Sub-step 4612 receiving a service request sent by the UE in response to the paging message.

Sub-step 4613: sending a request for establishing an air-interface bearer to the base station currently serving the UE, according to the service request.

Sub-step 4614: establishing the second data transmission path between the first gateway function entity and the base station, after the air-interface bearer between the UE and the base station is established.

In this embodiment, when the UE to which the downlink data is destined is in the connected state, only a connection between the base station and the network slice needs to be directly established before transmitting the downlink data to the UE. In the specific implementation, as shown in FIG. 4C, the sub-step 461 includes sub-steps 4615-4616.

Sub-step 4615: sending the request for establishing the air-interface bearer to the base station currently serving the UE, when the UE is in the connected state.

Sub-step 4616: establishing the second data transmission path between the first gateway function entity and the base station, after the air-interface bearer between the UE and the base station is established.

Detailed steps of the data transmission method of the present disclosure in actual applications in cases that the UE is in the idle state and in the connected state are described hereinafter, respectively.

Figure 5:
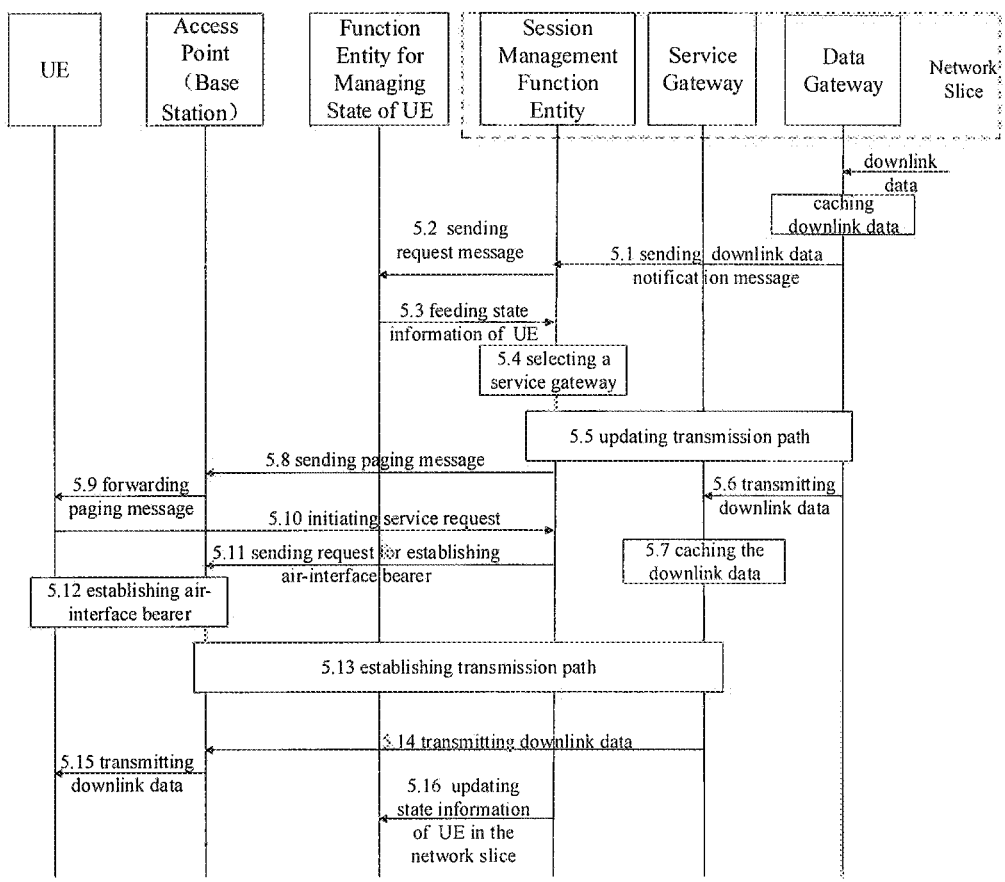
FIG. 5 is a flowchart of the data transmission method when a UE is in an idle state according to some embodiments of the present disclosure.

As shown in FIG. 5, the data transmission method provided in some embodiments of the present disclosure when the UE is in the idle state specifically includes steps 5.1 to 5.16.

Step 5.1: caching, by the data gateway in the idle network slice, the downlink data firstly when the data gateway receives the downlink data and sending, by the data gateway, the downlink data notification message to the session management function entity.

Step 5.2: sending the request message to a management function entity for managing state information of the UE (i.e. the above function entity for managing the state of the UE) when the session management function entity receives the downlink data notification message, to obtain the state information of the UE.

Step 5.3: feeding, by the management function entity for managing state information of the UE, the state information of the UE back to the session management function entity according to the request message, wherein, the state information of the UE includes the UE being in the idle state and up-to-date location information of the UE being the location area information in the latest location update of the UE.

Step 5.4: selecting a suitable service gateway for the UE according to the state information of the UE by the session management function entity after the session management function entity has received the state information of the UE.

Step 5.5: if the selected service gateway is different from a previous service gateway, establishing, by the session management function entity, a transmission path between the selected service gateway and the data gateway, i.e., updating the transmission path; otherwise, notifying, by the session management function entity, the data gateway to perform the transmission of the downlink data through a previous transmission path.

Step 5.6: transmitting, by the data gateway, the downlink data to the service gateway through the updated transmission path or the previous transmission path.

Step 5.7: caching, by the service gateway, the downlink data.

Step 5.8: sending, by the session management function entity, the paging message to the base station.

Step 5.9: forwarding, by the base station, the paging message to the UE.

Step 5.10: initiating, by the UE, the service request to the session management function entity.

Step 5.11: sending, by the session management function entity, the request for establishing the air-interface bearer to the base station.

Step 5.12: establishing, by the base station, the air-interface bearer between the base station and the UE.

Step 5.13: establishing the transmission path between the base station and the service gateway.

Step 5.14: transmitting, by the service gateway, the downlink data through the transmission path between the service gateway and the base station.

Step 5.15: transmitting, by the base station, the downlink data received by the base station to the UE.

Step 5.16: sending, by the session management function entity, the state information of the UE to the management function entity for managing state information of the UE after the service gateway is selected, so that the management function entity for managing state information of the UE updates the state information of the UE.

Figure 6:
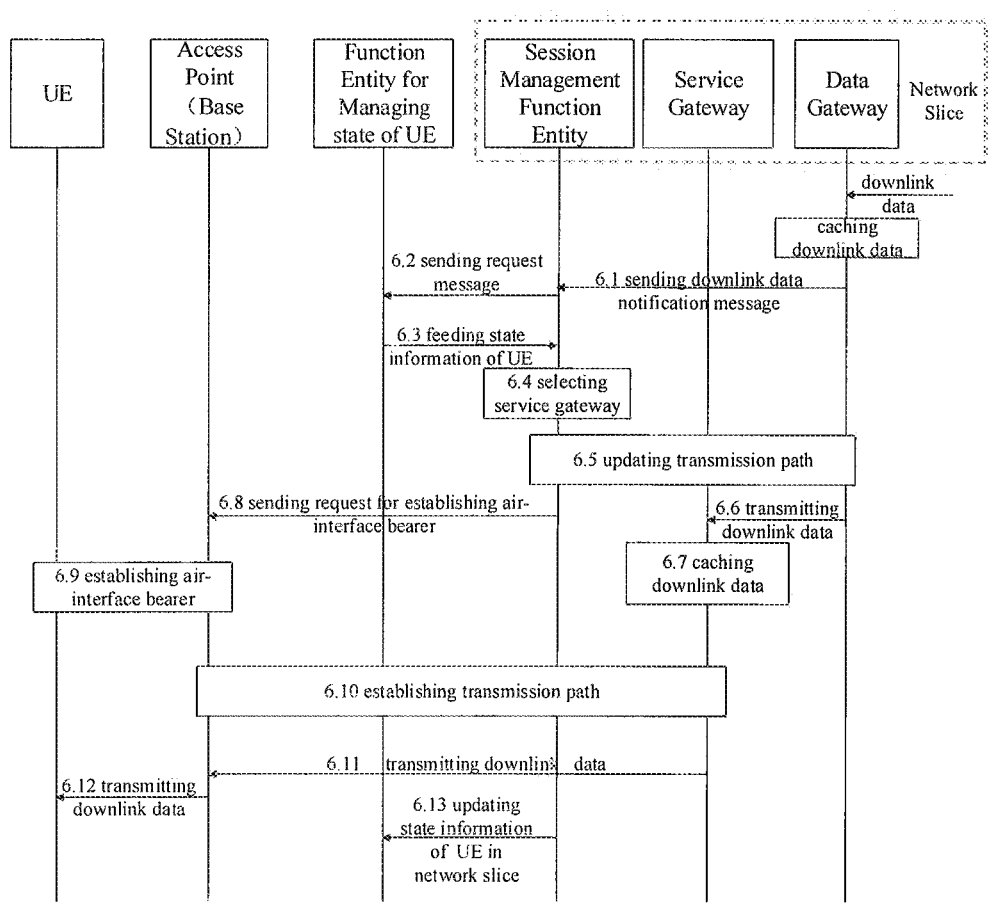
FIG. 6 is a flowchart of the data transmission method when a UE is in a connected state according to some embodiments of the present disclosure.

As shown in FIG. 6, the data transmission method provided in some embodiments of the present disclosure specifically includes steps 6.1 to 6.13 when the UE is in the connected state.

Step 6.1: caching, by the data gateway in an idle network slice, the downlink data firstly when the data gateway receives the downlink data, and sending, by the data gateway, the downlink data notification message to the session management function entity.

Step 6.2: sending, by the session management function entity, the request message to the management function entity for managing state information of the UE when the session management function entity receives the downlink data notification message, to obtain the state information of the UE.

Step 6.3: feeding, by the management function entity for managing state information of the UE, the state information of the UE back to the session management function entity according to the request message, wherein, the state information of the UE includes the UE being in the connected state and the up-to-date location information of the UE being information of the base station serving the UE currently, such as identification information of the base station.

Step 6.4: selecting a suitable service gateway for the UE according to the state information of the UE by the session management function entity after the session management function entity receives the state information of the UE.

Step 6.5: if the selected service gateway is different from a previous service gateway, establishing, by the session management function entity, a transmission path between the selected service gateway and the data gateway, i.e., updating the transmission path; otherwise, notifying, by the session management function entity, the data gateway to perform the transmission of the downlink data through a previous transmission path.

Step 6.6: transmitting, by the data gateway, the downlink data to the service gateway through the updated transmission path or the previous transmission path.

Step 6.7: caching, by the service gateway, the downlink data.

Step 6.8: sending, by the session management function entity, the request for establishing the air-interface bearer to the base station.

Step 6.9: establishing, by the base station, the air-interface bearer between the base station and the UE.

Step 6.10: establishing the transmission path between the base station and the service gateway.

It should be noted that another implementation of steps 6.8 to 6.10 is that the session management function entity sends a message to the UE to trigger the UE to initiate a service request procedure.

Step 6.11: transmitting, by the service gateway, the downlink data through the transmission path between the service gateway and the base station.

Step 6.12: transmitting, by the base station, the downlink data received by the base station to the UE.

Step 6.13: sending, by the session management function entity, the state information of the UE to the management function entity for managing state information of the UE after the service gateway is selected, so that the management function entity for managing state information of the UE updates the state information of the UE.

In the technical solution of the present embodiment, when the data gateway in the idle network slice receives the downlink data, the data gateway caches the downlink data firstly and then triggers selection of the service gateway. Only after the service gateway needed for transmitting the downlink data is determined, the data gateway transmits the downlink data to the service gateway, and the determined service gateway caches the downlink data so as to simplify the transmission of the downlink data in the network slice and reduce resource consumption in the network slice. Furthermore, the method provided in the present disclosure ensures accurate transmission of the downlink data and enhance communication reliability.

Figure 7:
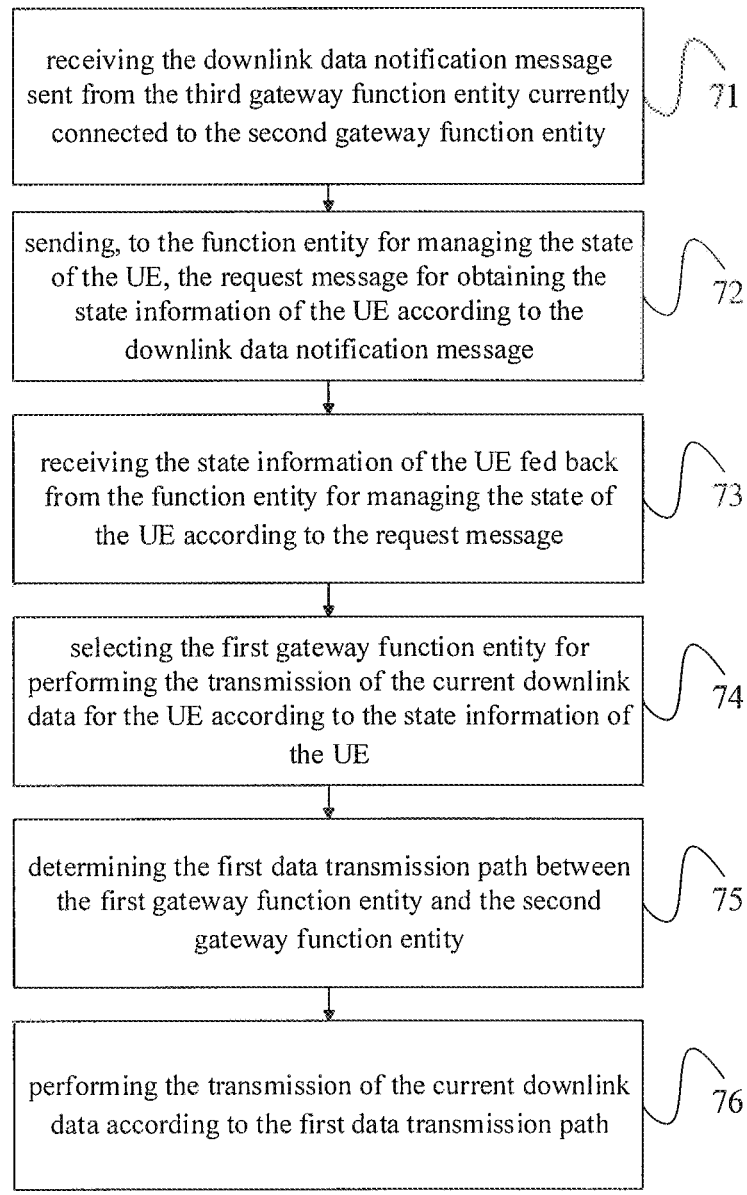
FIG. 7 is a flowchart of a data transmission method according to some embodiments of the present disclosure.

As shown in FIG. 7, another example of the data transmission method provided in some embodiments of the present disclosure includes step 71 to step 76.

Step 71: receiving the downlink data notification message sent from the third gateway function entity currently connected to the second gateway function entity.

In the embodiment, the second gateway function entity refers to the data gateway, and the third gateway function entity refers to the previous service gateway connected to the data gateway.

Step 72: sending, to the function entity for managing the state of the UE, the request message for obtaining the state information of the UE according to the downlink data notification message.

Step 73: receiving the state information of the UE fed back from the function entity for managing the state of the UE according to the request message.

Step 74: selecting the first gateway function entity for performing the transmission of the current downlink data for the UE according to the state information of the UE.

Step 75: determining the first data transmission path between the first gateway function entity and the second gateway function entity.

Step 76: performing the transmission of the current downlink data according to the first data transmission path.

It should be noted that the data transmission method is used in a data transmission apparatus in the present disclosure. Specifically, the data transmission apparatus may be included in the session management function entity.

In the embodiment, it is the previous service gateway connected with the data gateway that triggers the downlink data notification message. When a bearing capacity of the data gateway is limited and cannot receive too much downlink data, the downlink data is transmitted to the previous service gateway firstly, and then the previous service gateway triggers the downlink data notification message, so that the session management function entity performs the selection of service gateway, and the accurate transmission of the downlink data is assured.

It is noted that the steps 74, 75 and 76 in the embodiment may be implemented in a way similar to those for steps 44, 45 and 46, respectively, and thus are not repeated herein.

Figure 8:
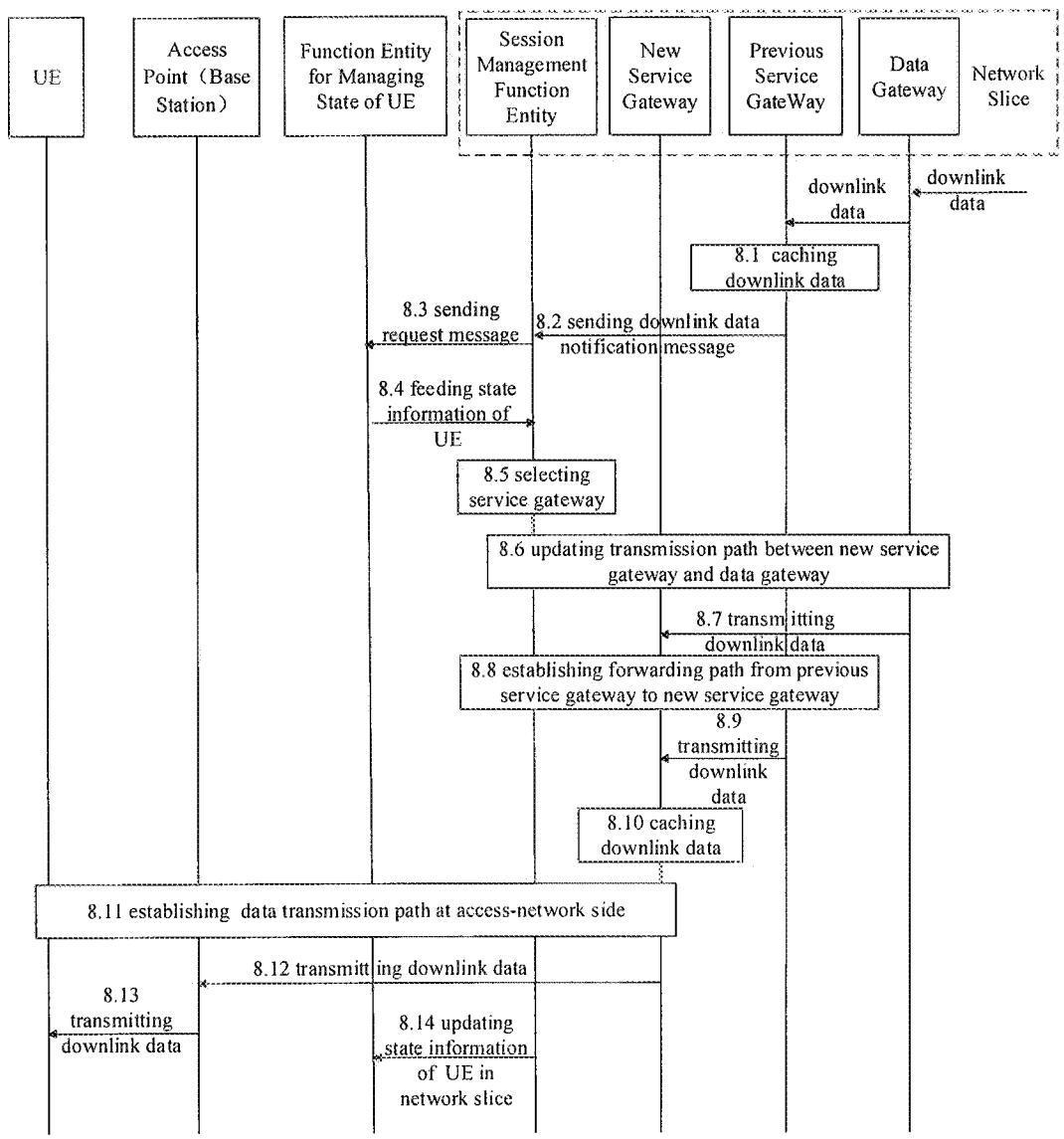
FIG. 8 is a detailed flowchart of a data transmission method according to some embodiments of the present disclosure.
Figure 9A:
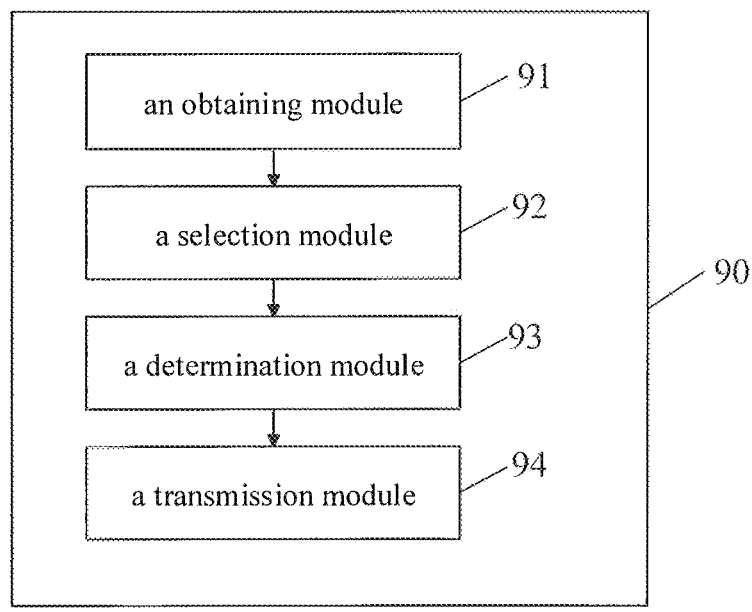
FIG. 9A is a structural schematic diagram of a data transmission apparatus according to some embodiments of the present disclosure.
Figure 9B:
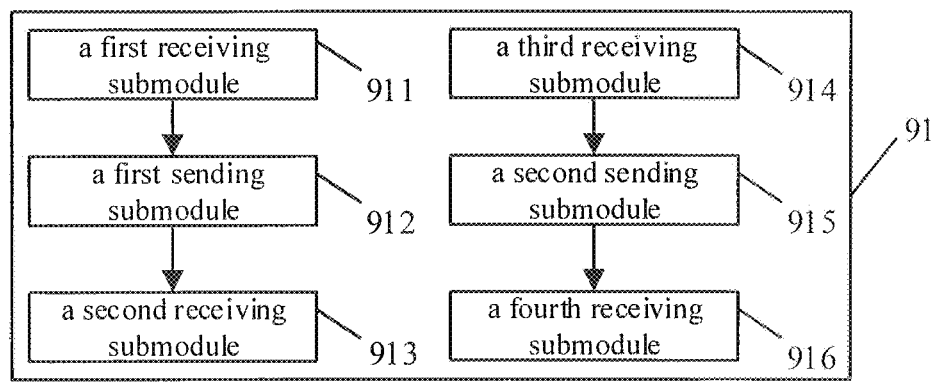
FIG. 9B is a detailed structural schematic diagram of an obtaining module of the data transmission apparatus shown in FIG. 9A.
Figure 9C:
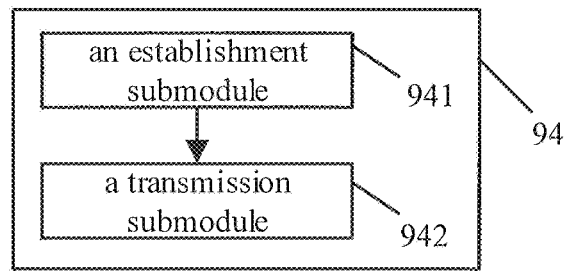
FIG. 9C is a detailed structural schematic diagram of a transmission module of the data transmission apparatus shown in FIG. 9A.
Figure 9D:
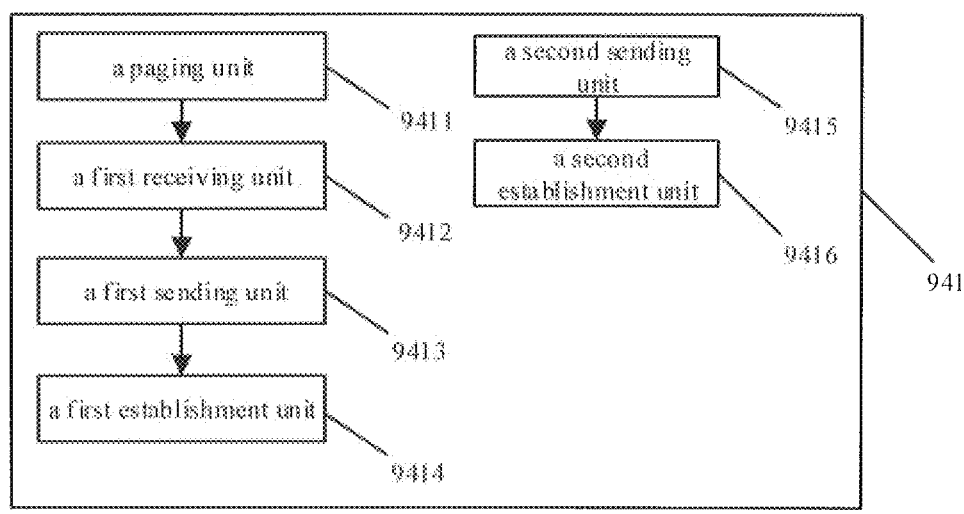
FIG. 9D is a detailed structural schematic diagram of an establishment submodule of the transmission module of the data transmission apparatus shown in 9A.

In actual applications, as shown in FIG. 8, the data transmission method provided in some embodiments of the present disclosure specifically includes steps 8.1 to 8.14.

Step 8.1: transmitting, by the data gateway in the idle network slice, downlink data received by the data gateway to the previous service gateway connected to the data gateway, and caching, by the previous service gateway, the downlink data.

Step 8.2: sending, by the previous service gateway, the downlink data notification message to the session management function entity.

Step 8.3: sending the request message for obtaining the state information of the UE to the management function entity for managing state information of the UE, by the session management function entity when the session management function entity receives the downlink data notification message.

Step 8.4: feeding, by the management function entity for managing state information of the UE, the state information of the UE back to the session management function entity according to the request message, wherein, the state information of the UE includes the UE being in the idle state or in the connected state and the up-to-date location information of the UE; when the UE is in the idle state, the up-to-date location information of the UE is the location area information in the latest location update of the UE; and when the UE is in the connected state, the up-to-date location information of the UE is the information of the base station currently serving the UE.

Step 8.5: selecting a suitable service gateway for the UE according to the state information of the UE by the session management function entity after the session management function entity receives the state information of the UE.

Step 8.6: if the selected service gateway is different from the previous service gateway, establishing, by the session management function entity, the transmission path between the selected service gateway and the data gateway, i.e., updating the transmission path; otherwise, notifying, by the session management function entity, the data gateway to perform the transmission of the downlink data through the previous transmission path.

Step 8.7: transmitting, by the data gateway, the downlink data to the selected service gateway through the updated transmission path.

Step 8.8: establishing a forwarding path from the previous service gateway to the selected service gateway.

Step 8.9: transmitting, by the previous service gateway, the cached downlink data to the selected service gateway.

Step 8.10: caching, by the selected service gateway, the downlink data.

Step 8.11: establishing a data transmission path between the network slice and an access-network side.

It is noted that, through the step 8.11, the session management function entity pages the UE in the idle state to establish the air-interface bearer and establish the transmission path between the base station and the selected service gateway. Detailed processes are similar to those in the above embodiments and thus are not repeated herein.

Step 8.12: transmitting, by the selected service gateway, the downlink data through the transmission path between the selected service gateway and the base station. It is noted that the downlink data includes the downlink data received by the selected service gateway and transmitted by the data gateway and the downlink data forwarded from the previous service gateway to the selected service gateway.

Step 8.13: transmitting, by the base station, the downlink data received by the base station to the UE.

Step 8.14: sending, by the session management function entity, the state information of the UE to the management function entity for managing state information of the UE after the service gateway is selected, so that the management function entity for managing a state of the UE updates the state information of the UE.

It is noted that, in the embodiment of the present disclosure, after the data gateway in the idle network slice receives the downlink data, the data gateway transmits the downlink data to the previous service gateway through a path established previously, and the previous service gateway caches the downlink data, and the selection of a new service gateway is triggered. After the new service gateway for receiving the downlink data is determined, the transmission path between the data gateway and the new service gateway and the forwarding path between the previous service gateway and the new service gateway are established. Then, the selected new service gateway caches the downlink data. Therefore, reliable transmission of the downlink data is ensured, and a reliability of network communication is enhanced.

As shown in FIG. 9, some embodiments of the present disclosure provide a data transmission apparatus 90. The data transmission apparatus 90 includes: an obtaining module 91, configured to receive state information of a UE to which downlink data is destined; a selection module 92, configured to select a first gateway function entity for transmission of current downlink data for the UE according to the state information of the UE; a determination module 93, configured to determine a first data transmission path between the first gateway function entity and a second gateway function entity; and a transmission module 94, configured to perform the transmission of the current downlink data through the first data transmission path.

Specifically, the obtaining module 91 includes: a first receiving submodule 911, configured to receive a downlink data notification message sent from the second gateway function entity; a first sending submodule 912, configured to send a request message for obtaining the state information of the UE to a function entity for managing the state of the UE, according to the downlink data notification message; and a second receiving submodule 913, configured to receive the state information of the UE fed back by the function entity for managing the state of the UE according to the request message.

Optionally, the obtaining module 91 includes: a third receiving submodule 914, configured to receive a downlink data notification message sent from a third gateway function entity currently connected to the second gateway function entity; a second sending submodule 915, configured to send the request message for obtaining the state information of the UE to the function entity for managing the state of the UE, according to the downlink data notification message; and a fourth receiving submodule 916, configured to receive the state information of the UE fed back by the function entity for managing the state of the UE according to the request message.

Specifically, the selection module 92 is configured to: when the UE is in the idle state, select the first gateway function entity for the transmission of the current downlink data according to location area information in the latest location update of the UE; or when the UE is in the connected state, select the first gateway function entity for the transmission of the current downlink data, according to the information of the base station currently serving the UE.

Specifically, the determination module 93 is configured to: determine the first data transmission path between the first gateway function entity and the second gateway function entity, when a third gateway function entity currently connected with the second gateway function entity is different from the first gateway function entity.

Optionally, the transmission module 94 includes an establishment submodule 941, configured to determine the second data transmission path between the first gateway function entity and the base station currently serving the UE, according to the first data transmission path; a transmission submodule 942, configured to transmit the downlink data cached in the first gateway function entity to the UE through the second data transmission path.

Specifically, the establishment submodule 941 includes: a paging unit 9411 configured to send a paging message to the UE when the UE is in the idle state; a first receiving unit 9412 configured to receive a service request sent by the UE in response to the paging message; a first sending unit 9413 configured to send a request for establishing an air-interface bearer to the base station currently serving the UE, according to the service request; and a first establishment unit 9414 configured to establish the second data transmission path between the first gateway function entity and the base station, after the air-interface bearer between the UE and the base station is established.

Optionally, the establishment submodule 941 includes: a second sending unit 9415 configured to sending, when the UE is in the connected state, the request for establishing the air-interface bearer to the base station currently serving the UE; and a second establishment unit 9416 configured to establish the second data transmission path between the first gateway function entity and the base station, after the air-interface bearer between the UE and the base station is established.

It should be noted that, the downlink data cached in the first gateway function entity is the downlink data sent from the data gateway to the first gateway function entity, or is the downlink data sent from the third gateway function entity connected currently to the second gateway function entity to the first gateway function entity through the forwarding path.

It is noted that, the apparatus in this embodiment is an apparatus capable of performing the method in the above embodiment correspondingly, and all implementations in the method in the above embodiment are applicable to the apparatus in this embodiment and may achieve the same technical effect.

Figure 10:
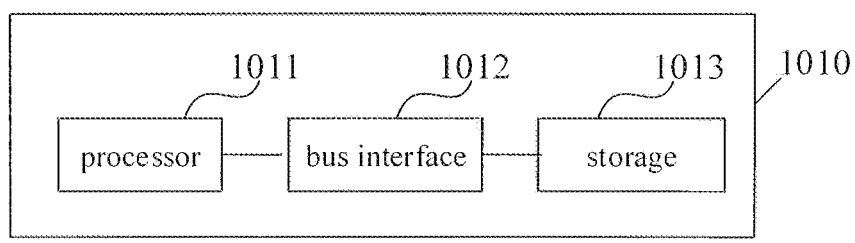
FIG. 10 is another structural schematic diagram of a data transmission apparatus according to some embodiments of the present disclosure.

As shown in FIG. 10, some embodiments of the present disclosure provide a data transmission apparatus 1010. The data transmission apparatus 1010 includes a processor 1011 and a storage 1013 connected to the processor 1011 through a bus interface 1012. The storage 1013 is configured to store computer instructions and data used by the processor 1011 when the processor 1011 performs operations. When the processor 1011 invokes and executes the computer instructions and data stored in the storage 1013, the processor 1011 implements functions of the following modules: the obtaining module configured to receive state information of the UE to which downlink data is destined; the selection module configured to select the first gateway function entity for transmission of current downlink data for the UE according to the state information of the UE; the determination module configured to determine the first data transmission path between the first gateway function entity and the second gateway function entity; and the transmission module configured to perform the transmission of the current downlink data according to the first data transmission path.

The processor 1011 may further implement a function of any other module or unit in the above apparatus. It is noted that the apparatus may be a part of the session management function entity.

Additionally, when the processor 1011 invokes and executes the computer instructions and data stored in the storage 1013, the processor 1011 may implement the data transmission method provided in the embodiments shown in FIG. 3 to FIG. 8 of the present disclosure.

It may be understood that, a part or all of the steps of the above embodiments may be implemented by hardware or by computer programs instructing hardware. The computer programs include instructions for executing a part of all of the steps in the above method, and may be stored in a computer readable storage medium. The computer readable storage medium may be any type of storage medium.

Figure 11:
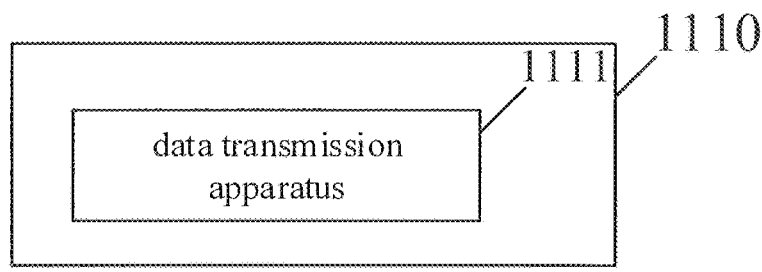
FIG. 11 is a structural schematic diagram of a session management device according to some embodiments of the present disclosure.

The present disclosure also provides a session management device 1110. As shown in FIG. 11, the session management device 1110 may include a data transmission apparatus 1111. The data transmission apparatus 1111 may be the data transmission apparatus provided in the above embodiments of the present disclosure, such as the data transmission apparatus 90 shown in FIG. 9A or the data transmission apparatus 1010 in FIG. 10, and the data transmission apparatus 1111 may include modules, submodules or units of the data transmission apparatus in the above embodiments, or may achieve the functions of the above data transmission apparatus described above.

It is noted that, the session management device may be connected to the data gateway, the service gateway or the base station when performing data communication, so as to ensure accurate transmission of data in the network.

The above are optional embodiments of the present disclosure. It should be noted that numerous modifications and embellishments may be made by one of ordinary skills in the art without departing from the spirit of the present disclosure, and such modifications and embellishments also fall within the scope of the present disclosure.

What is claimed is:

1. A data transmission method performed by a data transmission apparatus, comprising:
    obtaining state information of a User Equipment (UE) to which downlink data is destined;
    selecting, for the UE, a first gateway function entity for transmission of the downlink data according to the state information of the UE;
    determining a first data transmission path between the first gateway function entity and a second gateway function entity; and
    performing the transmission of the downlink data according to the first data transmission path,
    wherein the first gateway function entity is a new serving gateway selected for the transmission of the downlink data, the second gateway function entity is a data gateway caching the downlink data, and
    before selecting, for the UE, the first gateway function entity for transmission of the downlink data according to the state information of the UE, the method further comprises:
    receiving a downlink data notification message sent from a third gateway function entity currently connected to the second gateway function entity, wherein the third gateway function entity is a previous serving gateway connected to the second gateway function entity.

2. The data transmission method according to claim 1, wherein the obtaining state information of the UE to which downlink data is destined further comprises:
    sending a request message for obtaining the state information of the UE to a function entity for managing a state of the UE, according to the downlink data notification message; and
    receiving the state information of the UE fed back from the function entity managing a state of the UE according to the request message.

3. The data transmission method according to claim 1, wherein, the selecting, for the UE, a first gateway function entity for transmission of the downlink data according to the state information of the UE, comprises:
    selecting, when the UE is in an idle state, the first gateway function entity for the transmission of the downlink data, according to location area information in a latest location update of the UE; or
    selecting, when the UE is in a connected state, the first gateway function entity for the transmission of the downlink data, according to information of a base station serving the UE currently.

4. The data transmission method according to claim 1, wherein, the determining a first data transmission path between the first gateway function entity and a second gateway function entity, comprises:
    establishing the first data transmission path between the first gateway function entity and the second gateway function entity.

5. The data transmission method according to claim 1, wherein, the performing the transmission of the downlink data according to the first data transmission path, comprises:
    establishing a second data transmission path between the first gateway function entity and a base station currently serving the UE, according to the first data transmission path; and
    transmitting the downlink data cached in the first gateway function entity to the UE through the second data transmission path.

6. The data transmission method according to claim 5, wherein, the establishing a second data transmission path between the first gateway function entity and a base station currently serving the UE, according to the first data transmission path, comprises:
    sending a paging message to the UE when the UE is in the idle state;
    receiving a service request sent by the UE in response to the paging message;
    sending a request for establishing an air-interface bearer to the base station currently serving the UE, according to the service request; and
    establishing the second data transmission path between the first gateway function entity and the base station, after the air-interface bearer between the UE and the base station is established.

7. The data transmission method according to claim 5, wherein, the establishing a second data transmission path between the first gateway function entity and a base station currently serving the UE, according to the first data transmission path, comprises:
    sending a request for establishing an air-interface bearer to a base station currently serving the UE, when the UE is in a connected state; and establishing the second data transmission path between the first gateway function entity and the base station, after the air-interface bearer between the UE and the base station is established.

8. The data transmission method according to claim 5, wherein, the downlink data cached in the first gateway function entity is:
   downlink data sent from the second gateway function entity to the first gateway function entity; or
   downlink data forwarded from the third gateway function entity currently connected to the second gateway function entity to the first gateway function entity through a forwarding path.

9. A data transmission apparatus, comprising:
   an obtaining primary-circuit configured to obtain state information of a User Equipment (UE) to which downlink data is destined;
   a selection primary-circuit configured to select, for the UE, a first gateway function entity for transmission of the downlink data according to the state information of the UE;
   a determination primary-circuit configured to determine a first data transmission path between the first gateway function entity and a second gateway function entity; and
   a transmission primary-circuit configured to perform the transmission of the downlink data according to the first data transmission path,
   wherein the first gateway function entity is a new serving gateway selected for the transmission of the downlink data, the second gateway function entity is a data gateway caching the downlink data, and
   the obtaining primary-circuit comprises a third receiving circuit configured to receive a downlink data notification message sent from a third gateway function entity currently connected to the second gateway function entity, wherein the third gateway function entity is a previous serving gateway connected to the second gateway function entity.

10. The data transmission apparatus according to claim 9, wherein the obtaining primary-circuit further comprises:
    a second sending circuit configured to send, according to the downlink data notification message, a request message for obtaining the state information of the UE to a function entity for managing a state of the UE; and
    a fourth receiving circuit configured to receive the state information of the UE fed back from the function entity for managing a state of the UE according to the request message.

11. The data transmission apparatus according to claim 9, wherein the selection primary-circuit is configured to:
    select, when the UE is in an idle state, the first gateway function entity for transmission of the downlink data, according to location area information in a latest location update of the UE; or
    select, when the UE is in a connected state, the first gateway function entity for the transmission of the downlink data, according to information of a base station serving the UE currently.

12. The data transmission apparatus according to claim 9, wherein the determination primary-circuit is configured to:
    establish the first data transmission path between the first gateway function entity and the second gateway function entity.

13. The data transmission apparatus according to claim 9, wherein the transmission primary-circuit comprises:
    an establishment circuit configured to establish a second data transmission path between the first gateway function entity and a base station currently serving the UE, according to the first data transmission path; and
    a transmission circuit configured to transmit the downlink data cached in the first gateway function entity to the UE through the second data transmission path.

14. The data transmission apparatus according to claim 13, wherein the establishment circuit comprises:
    a paging sub-circuit configured to send a paging message to the UE when the UE is in an idle state;
    a first receiving sub-circuit configured to receive a service request sent by the UE in response to the paging message;
    a first sending sub-circuit configured to send a request for establishing an air-interface bearer to the base station currently serving the UE, according to the service request; and
    a first establishment sub-circuit configured to establish the second data transmission path between the first gateway function entity and the base station, after the air-interface bearer between the UE and the base station is established.

15. The data transmission apparatus according to claim 13, wherein the establishment circuit comprises:
    a second sending sub-circuit configured to send a request for establishing an air-interface bearer to the base station currently serving the UE, when the UE is in a connected state; and
    a second establishment sub-circuit configured to establish the second data transmission path between the first gateway function entity and the base station, after the air-interface bearer between the UE and the base station is established.

16. The data transmission apparatus according to claim 13, wherein, the downlink data cached in the first gateway function entity is:
    downlink data sent from the second gateway function entity to the first gateway function entity; or
    downlink data forwarded from the third gateway function entity currently connected to the second gateway function entity to the first gateway function entity through a forwarding path.

17. A data transmission apparatus, comprising:
    a processor,
    a storage connected to the process through a bus interface and configured to store computer instructions and data used by the processor when the processor performs operations, wherein
    when the computer instructions are executed by the processor, the processor implements the method according to claim 1.

18. A session management device, comprising: the data transmission apparatus according to claim 9.

* * * * *